(12) United States Patent
Chen et al.

(10) Patent No.: US 7,508,180 B2
(45) Date of Patent: Mar. 24, 2009

(54) SWITCHING REGULATOR FOR FIXING A FREQUENCY

(75) Inventors: Ming-Hsueh Chen, Taipei County (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 508 days.

(21) Appl. No.: 11/456,215

(22) Filed: Jul. 10, 2006

(65) Prior Publication Data
US 2007/0222395 A1 Sep. 27, 2007

(30) Foreign Application Priority Data
Mar. 22, 2006 (TW) .............................. 95109912 A

(51) Int. Cl.
*G05F 1/40* (2006.01)
(52) U.S. Cl. .................. 323/282; 323/285; 323/351
(58) Field of Classification Search ................. 315/224, 315/291, 307; 323/282–288, 222, 351
See application file for complete search history.

(56) References Cited

U.S. PATENT DOCUMENTS

| 6,456,050 B1 | 9/2002 | Agiman |
| 6,774,611 B2 | 8/2004 | Umminger et al. |
| 6,791,306 B2 | 9/2004 | Walters |
| 6,885,175 B2 | 4/2005 | Mihalka |
| 6,894,471 B2 * | 5/2005 | Corva et al. .................. 323/282 |
| 7,132,820 B2 * | 11/2006 | Walters et al. ............... 323/288 |
| 7,352,160 B2 * | 4/2008 | Shimizu et al. .............. 323/282 |
| 7,400,127 B2 * | 7/2008 | Steele .......................... 323/288 |
| 2002/0017897 A1 * | 2/2002 | Wilcox et al. ................ 323/282 |
| 2005/0007087 A1 | 1/2005 | Pullen |

* cited by examiner

*Primary Examiner*—Douglas W Owens
*Assistant Examiner*—Ephrem Alemu
(74) *Attorney, Agent, or Firm*—Winston Hsu

(57) ABSTRACT

A switching regulator includes a power stage, an output capacitor, a first reference voltage generator, a comparator, a constant-time trigger, a frequency-to-voltage converter, and an error amplifier. The power stage includes a first switch, a second switch coupled to the first switch, and an output inductor. The comparator is coupled to the output capacitor, and output inductor, and the first reference voltage generator. The constant-time trigger is coupled to the comparator and the power stage. The error amplifier includes a first input end coupled to the frequency-to-voltage converter, a second input end, and an output end coupled to the constant-time trigger.

18 Claims, 4 Drawing Sheets

SWITCHING REGULATOR FOR FIXING A FREQUENCY

BACKGROUND OF THE INVENTION

1. Field of the Invention

The present invention relates to a switching regulator, and more particularly, to a switching regulator for fixing a frequency by controlling a constant-time trigger.

2. Description of the Prior Art

Regulators usually include switching regulators and liner regulators. The characteristics of liner regulators are that they are cheap, easy to use and respond quickly. However the efficiency of liner regulators is poor, often consuming 50% of the power. Although a switching regulator has slow response, its power efficiency is great. Power consumption plays an important role in circuit design nowadays. As for a quick response requirement, switching regulators utilize a constant-time trigger to substitute for an error amplifier with additional frequency compensation elements used for controlling signal differences between PWM loops. The constant-time trigger is used for triggering a fixed on time or a fixed off time to control the whole switching regulator.

Please refer to FIG. 1. FIG. 1 is a diagram of a switching regulator 10 according to the prior art. The switching regulator 10 includes a power stage 12, an output capacitor Cout, a loading Rload, a reference voltage generator 14, a comparator 15, and a constant-time trigger 16. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 16 and a control end 104 of the second switch SW2 for processing an inverse operation on a signal outputted from the constant-time trigger 16. The output capacitor Cout is coupled to the output inductor Lout with an output voltage Vout across the capacitor. The output capacitor Cout further includes an equivalent series resistance ESR. The reference voltage generator 14 is used for generating a reference voltage Vref. The comparator 15 includes a first input end 152 coupled to the output inductor Lout and the output capacitor Cout for receiving a feedback voltage $V_{FB}$ (equals the output voltage Vout). The comparator 15 includes a second input end 154 coupled to the reference voltage generator 14. The constant-time trigger 16 is coupled to the comparator 15 and the power stage 12. The constant-time trigger 16 is used for controlling turning on and off the first switch SW1 and the second switch SW2 of the power stage 12 according to a result of the comparator 15. An input end 122 of the first switch SW1 is coupled to an input voltage terminal Vin, and an input end 124 of the second switch SW2 is coupled to ground. The comparator 15 is an error comparator. The first switch SW1 and the second switch SW2 are metal-oxide semiconductor transistors (MOS). When the constant-time trigger 16 is an on-time trigger, it is used for controlling on time of the first switch SW1 and the second switch SW2. When the constant-time trigger 16 is an off-time trigger, it is used for controlling off time of the first switch SW1 and the second switch SW2.

Please refer to FIG. 2 and FIG. 1. FIG. 2 is a diagram illustrating signal waveforms in FIG. 1. The upper waveform is a variation of an inductor current $I_L$ in time, where it rises in a positive slope for a span and drops in a negative slope for a span. Due to the output voltage Vout equaling the feedback voltage $V_{FB}$, the feedback voltage $V_{FB}$ could be represented as the product of the inductor current $I_L$ and the equivalent series resistance ESR. Assume that the constant-time trigger 16 is an on time trigger for controlling turning on the first switch SW1 for a fixed time $T_{ON}$. The comparator 15 is used for comparing the feedback voltage $V_{FB}$ and the reference voltage Vref. When the feedback voltage $V_{FB}$ is lower than the reference voltage Vref, the comparator 15 triggers a high level signal to the constant-time trigger 16. The constant-time trigger 16 controls the first switch SW1 to turn on for the fixed time $T_{ON}$ and to turn off the first switch SW1 for a fixed time $T_{OFF}$. The constant-time trigger 16 turns on the second switch SW2 to form a loop.

Please continue to refer to FIG. 1 and FIG. 2. Assume that the constant-time trigger 16 is an on-time trigger. The on-time of the first switch SW1 is $T_{ON}$ and the off-time of the first switch SW1 is $T_{OFF}$. A switching frequency f1 of the switching regulator 10 can be represented as the following equation: f1=Vout/$T_{ON}$(Vin−$I_L$×$R_{DSON}$), where $T_{ON}$ is the on-time of the first switch SW1, $I_L$ is the inductor current, and $R_{DSON}$ is the resistor of the switch when conducting. Thus, the frequency f1 relates to the output voltage Vout, the input voltage Vin and the resistor $R_{DSON}$.

Fixing frequency applications of switching regulators are already disclosed in U.S. Pat. No. 6,774,611 "Circuits and Methods for Synchronizing Non-constant Frequency Switching Regulators with A Phase Locked Loop", U.S. Pat. No. 6,885,175 "Fixed Frequency Hysteretic Regulator", and U.S. Pat. No. 6,456,050 "Virtual Frequency-Controlled Switching Voltage Regulator". In U.S. Pat. No. 6,774,611, the method of work is adjusting the on-time $T_{ON}$ and the off-time $T_{OFF}$ by a phase difference generated by a phase-locked loop (PLL).

In U.S. Pat. No. 6,885,175, the main application is aimed at a hysteresis system. Please refer to FIG. 3 that is a diagram of a hysteresis system 30 according to the prior art. The upper limit of the hysteresis system 30 is a first reference voltage Vref1, and the lower limit of the hysteresis system 30 is a second reference voltage Vref2. A comparator 35 is used for comparing the first reference voltage Vref1 with a feedback voltage $V_{FB}$, and a comparator 36 is used for comparing the second reference voltage Vref2 with the feedback voltage $V_{FB}$. The magnitude of the first reference voltage Vref1 and the magnitude of the second reference voltage Vref2 are controlled by an offset generator 32 which is controlled by a frequency f2 of the hysteresis system 30. When the frequency f2 of the hysteresis system 30 is too large, the offset generator 32 outputs the offsets Offset1 and Offset2 with a greater value. When the frequency f2 of the hysteresis system 30 is too small, the offset generator 32 outputs the offsets Offset1 and Offset2 with a smaller value. The hysteresis system 30 includes an adder 33 and a subtractor 34. The adder 33 is used for adding a reference voltage Vref and the offset Offset1 together to get the first reference voltage Vref1. The subtractor 34 is used for subtract the offset Offset2 from the reference voltage Vref to get the second reference voltage Vref2. Frequency fixing is achieved by utilizing the offset generator 32 to adjust the magnitude of the offsets Offset1 and Offset2.

In U.S. Pat. No. 6,456,050, the method of work is adding a feedback mechanism to the system. The off-time $T_{OFF}$ is adjusted by variations of current indirectly. Thus a frequency of the system is changed.

Due to the frequency f1 of the switching regulator 10 being relating to the output voltage Vout and the input voltage Vin, a different output voltage Vout and a different input voltage Vin leads to a different frequency f1 even though the on-time $T_{ON}$ is equal. The frequency f1 changes with variations of the output voltage Vout and the input voltage Vin. Therefore, the frequency of the system is unstable.

SUMMARY OF THE INVENTION

The claimed invention provides a switching regulator for fixing a frequency. The switching regulator includes a power stage, an output capacitor, a first reference voltage generator, a comparator, a constant-time trigger, a frequency-to-voltage converter, and an error amplifier. The power stage includes a first switch, a second switch coupled to the first switch, and an output inductor coupled to the first switch and the second switch. The output capacitor is coupled to the output inductor with an output voltage across the capacitor. The first reference voltage generator is used for generating a first reference voltage. A first input end of the comparator is coupled to the output inductor and the output capacitor for receiving the output voltage. A second input end of the comparator is coupled to the first reference voltage generator for receiving the first reference voltage. The comparator is used for comparing signals received at the first and second input ends of the comparator. The constant-time trigger is coupled between an output end of the comparator and a control end of the power stage. The constant-time trigger is used for controlling turning on and off the first switch and the second switch of the power stage according to a result of the comparator. The error amplifier includes a first input end coupled to an output end of the frequency-to-voltage converter, a second input end for receiving a second reference voltage, and an output end coupled to an control end of the constant-time trigger. The error amplifier is used for generating a regulation signal to control the constant-time trigger turning on and off the first switch and the second switch of the power stage according to signals received at the first and second input ends of the error amplifier.

The claimed invention provides a switching regulator for fixing a frequency. The switching regulator includes a plurality of power stages, an output capacitor, a first reference voltage generator, a comparator, a constant-time trigger, a frequency-to-voltage converter, and an error amplifier. Each power stage includes a first switch, a second switch coupled to the first switch, and an output inductor coupled to the first switch and the second switch. The output capacitor is coupled to the output inductors with an output voltage across the capacitor. The first reference voltage generator is used for generating a first reference voltage. A first input end of the comparator is coupled to the output inductors and the output capacitor for receiving the output voltage. A second input end of the comparator is coupled to the first reference voltage generator for receiving the first reference voltage. The comparator is used for comparing signals received at the first and second input ends of the comparator. The constant-time trigger is coupled between an output end of the comparator and a control end of the power stage. The constant-time trigger is used for controlling turning on and off the first switch and the second switch of each power stage according to a result of the comparator. The error amplifier includes a first input end coupled to an output end of the frequency-to-voltage converter, a second input end for receiving a second reference voltage, and an output end coupled to an control end of the constant-time trigger. The error amplifier is used for generating a regulation signal to control the constant-time trigger turning on and off the first switch and the second switch of each power stage according to signals received at the first and second input ends of the error amplifier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
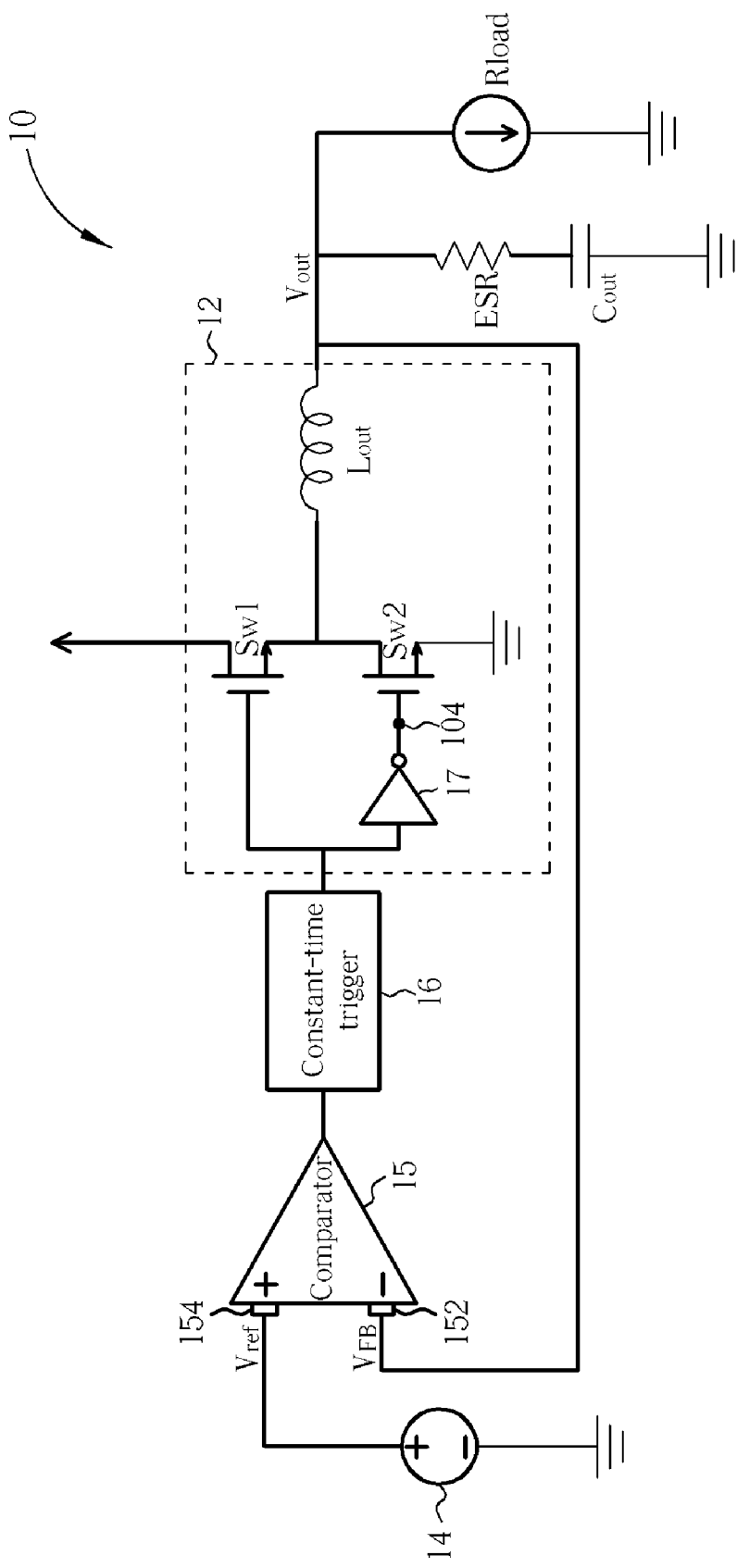
FIG. 1 is a diagram of a switching regulator according to the prior art.
Figure 2:
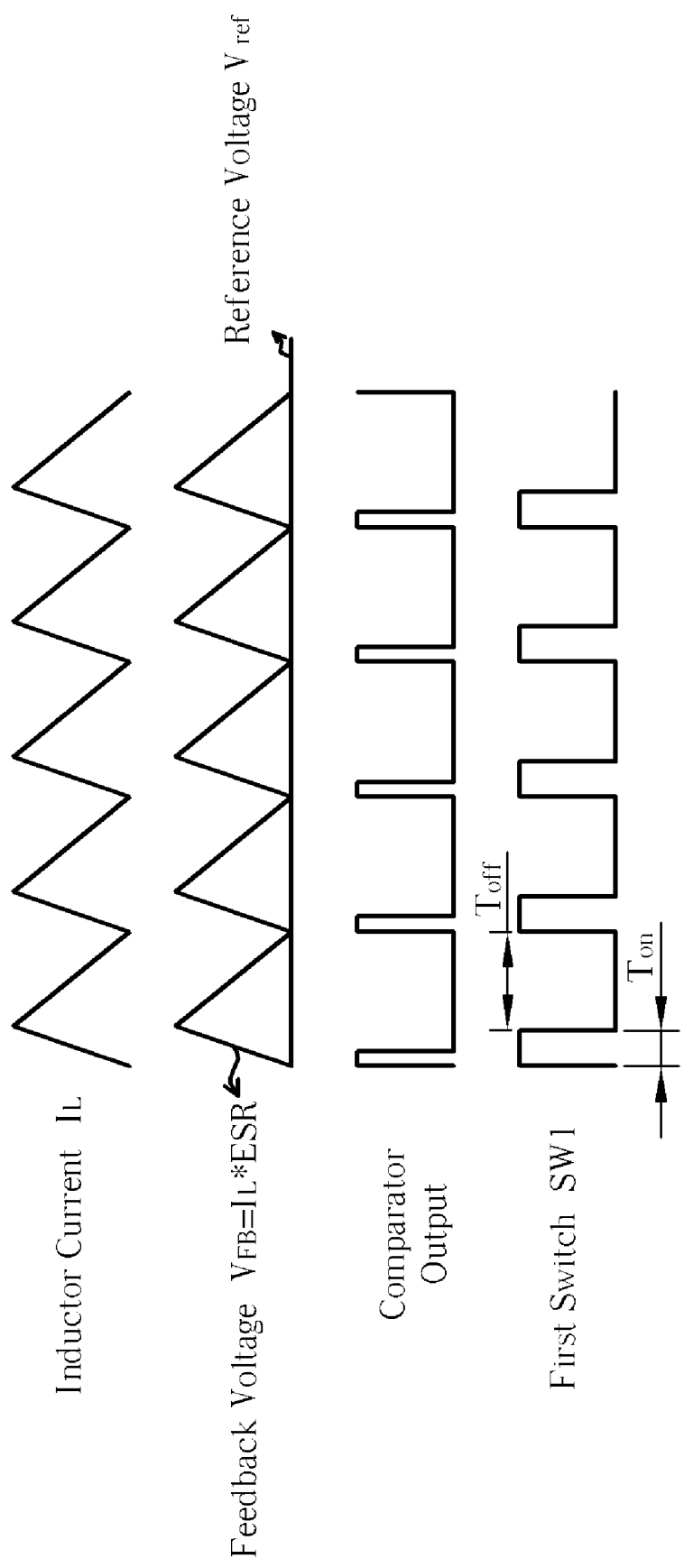
FIG. 2 is a diagram illustrating signal waveforms in FIG. 1.
Figure 3:
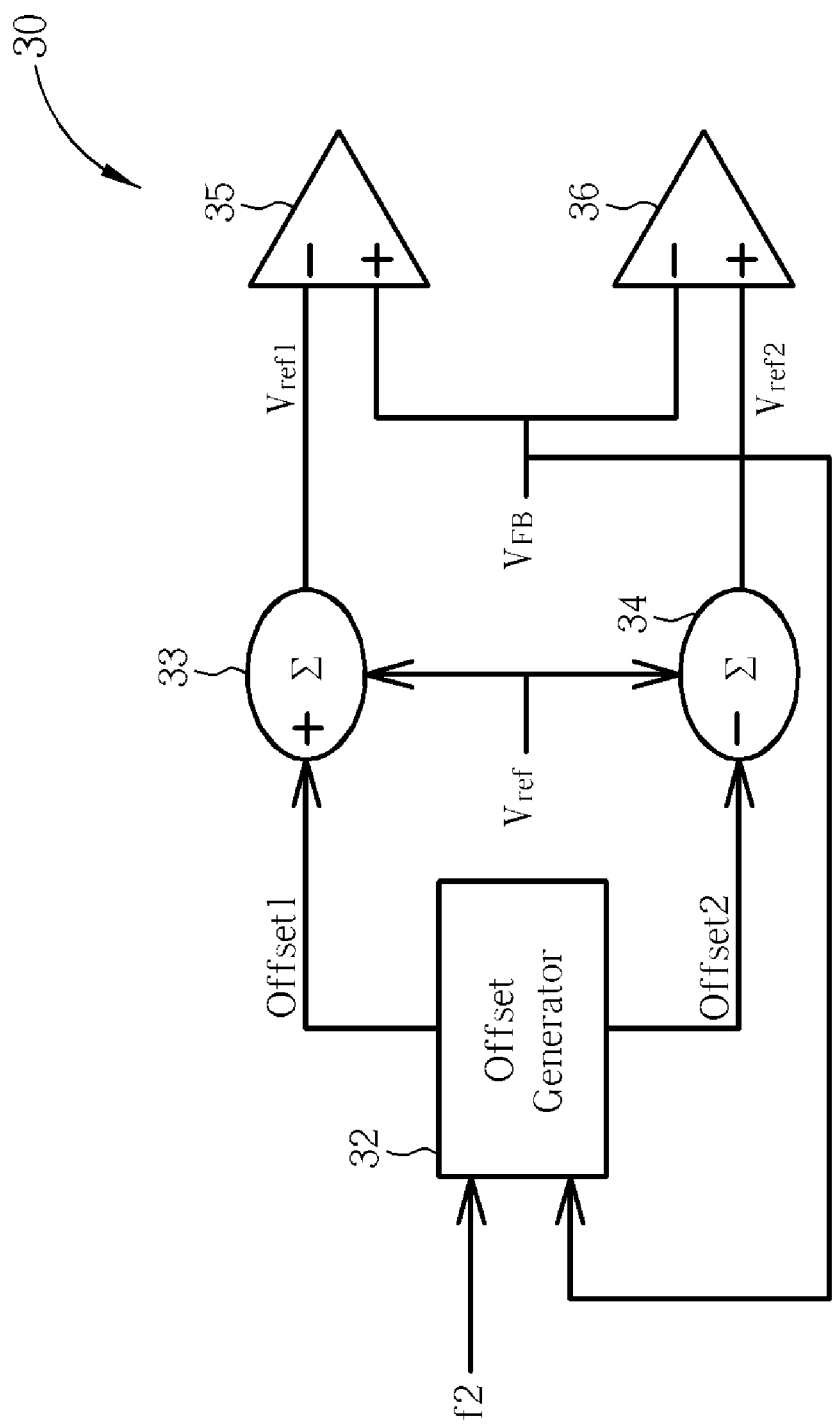
FIG. 3 is a diagram of a hysteresis system according to the prior art.
Figure 4:
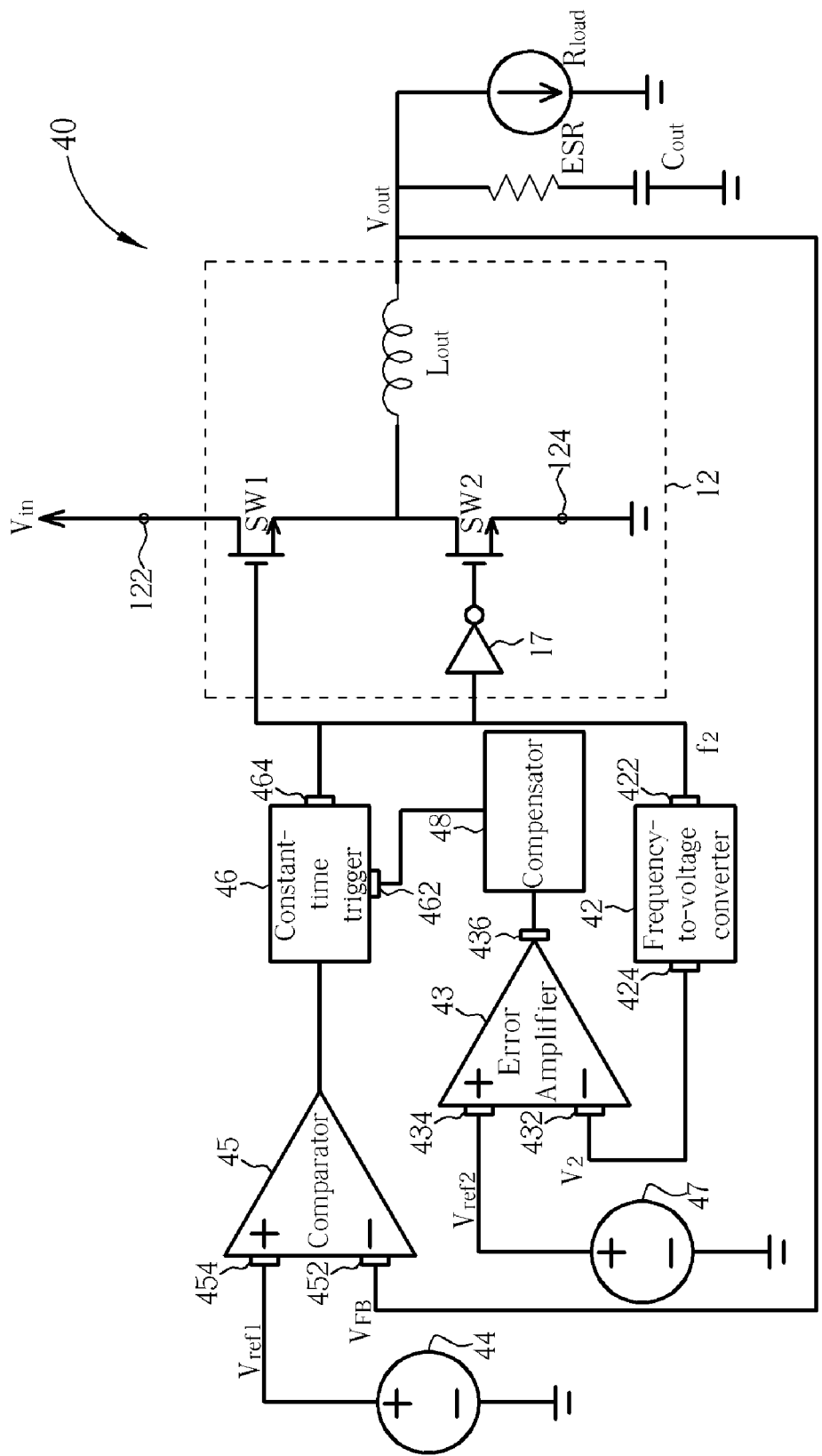
FIG. 4 is a diagram of a switching regulator according to the present invention.

Please refer to FIG. 4 that is a diagram of a switching regulator 40 according to the present invention. The switching regulator 40 includes a power stage 12, an output capacitor Cout, a loading Rload, a first reference voltage generator 44, a second reference voltage generator 47, a comparator 45, a constant-time trigger 46, a frequency-to-voltage converter 42, and an error amplifier 43. The power stage 12 includes a first switch SW1, a second switch SW2, an inverter 17, and an output inductor Lout. The second switch SW2 is coupled to the first switch SW1. The output inductor Lout is coupled to the first switch SW1 and the second switch SW2. The inverter 17 is coupled to the constant-time trigger 46 and a control end 104 of the second switch SW2 for processing an inverse operation on a signal outputted from the constant-time trigger 46. The output capacitor Cout is coupled to the output inductor Lout with an output voltage Vout across the capacitor. The output capacitor Cout further includes an equivalent series resistance ESR. The first reference voltage generator 44 is used for generating a first reference voltage Vref1. The second reference voltage generator 47 is used for generating a second reference voltage Vref2. The comparator 45 includes a first input end 452 coupled to the output inductor Lout and the output capacitor Cout for receiving a feedback voltage $V_{FB}$ (equals the output voltage Vout). The comparator 45 includes a second input end 454 coupled to the first reference voltage generator 44 for receiving the first reference voltage Vref1. The comparator 45 is used for comparing the feedback voltage $V_{FB}$ with the first reference voltage Vref1.

The constant-time trigger 46 is coupled to the comparator 45 and the power stage 12. The constant-time trigger 46 is used for controlling turning on and off the first switch SW1 and the second switch SW2 of the power stage 12 according to a result of the comparator 45. The frequency-to-voltage converter 42 includes an input end 422 coupled to an output end 464 of the constant-time trigger 46 for receiving a frequency of the constant-time trigger 46 and an output end 424 for outputting a voltage generated by the frequency-to-voltage converter 42. The frequency-to-voltage converter 42 is used for converting the frequency received at the input end 422 into voltage. The error amplifier 43 includes a first input end 432 coupled to the output end 424 of the frequency-to-voltage converter 42, a second input end 434 coupled to the second reference voltage generator 47 for receiving the second reference voltage Vref2, and an output end 436 coupled to a control end 462 of the constant-time trigger 46. The error amplifier 43 is used for generating a regulation signal to control the constant-time trigger 46 to turn on and off the first switch SW1 and the second switch SW2 of the power stage 12 according to signals received at the first and second input ends of the error amplifier 43.

Please continue to refer to FIG. 4. The switching regulator 40 further includes a compensator 48 coupled between the output end 436 of the error amplifier 43 and the control end 462 of the constant-time trigger 46. The compensator 48 is used for compensating stability of a loop formed by the error amplifier 43 and the constant-time trigger 46. An input end 122 of the first switch SW1 is coupled to an input voltage terminal Vin, and an input end 124 of the second switch SW2 is coupled to ground. The comparator 45 is an error comparator. The first switch SW1 and the second switch SW2 are metal-oxide semiconductor transistors (MOS). When the constant-time trigger 46 is an on-time trigger, it is used for controlling on time of the first switch SW1 and the second switch SW2. When the constant-time trigger 46 is an off-time trigger, it is used for controlling off time of the first switch SW1 and the second switch SW2.

Please continue to refer to FIG. 4. Assume that the constant-time trigger 46 is an on-time trigger. The on-time of the first switch SW1 is TON, and the off-time of the first switch SW1 is $T_{OFF}$. A switching frequency f2 of the switching regulator 40 can be represented as the following equation: $f2=Vout/T_{ON}(Vin-I_L \times R_{DSON})$, where $T_{ON}$ is the on-time of the first switch SW1, $I_L$ is the inductor current, and $R_{DSON}$ is the resistor of the switch when conducting. Thus, the frequency f2 relates to the output voltage Vout, the input voltage Vin and the resistor $R_{DSON}$. A voltage V2 is generated by converting the frequency f2 received at the input end 422 of the frequency-to-voltage converter 42 into voltage. The first input end 432 of the error amplifier 43 is used for receiving the voltage V2, and the second input end 434 of the error amplifier 43 is used for receiving the second reference voltage Vref2. The error amplifier 43 is used for generating the regulation signal to control the constant-time trigger 46 to turn on and off the first switch SW1 for an on-time $T_{ON}$ or an off-time $T_{OFF}$ according to signals received at the first and second input ends of the error amplifier 43. At this time, the frequency f2 of the switching regulator 40 is adjusted by adjusting the on-time $T_{ON}$ and the off-time $T_{OFF}$. When the gain of the loop formed by the frequency-to-voltage converter 42, the error amplifier 43, and the constant-time trigger 46 is big enough, the first input end 432 and the second input end 434 of the error amplifier 43 becomes a short circuit. This makes the second reference voltage Vref2 equal to the voltage V2 to achieve fixing frequency where the second reference voltage Vref2 is converted from a reference frequency.

The above-mentioned embodiments illustrate but do not limit the present invention. The constant-time trigger 46 could be an on-time trigger or an off-time trigger for controlling turning on or turning off the first switch SW1 and the second switch SW2. The inverter 17 can be coupled between the constant-time trigger 46 and a control end of the first switch SW1. The switching regulator 40 includes one power stage 12 but can be expanded to two or a plurality of power stages 12. Furthermore, the second reference voltage Vref2 is converted from a reference frequency and the frequency f2 of the switching regulator 40 could be chosen by adjusting the second voltage Vref2.

In conclusion, the present invention provides a switching regulator for fixing a frequency. The frequency f2 of the switching regulator 40 is converted into a voltage V2 through the frequency-to-voltage converter 42. After the error amplifier 43, the second reference voltage Vref2 equals to the voltage V2. The time of the constant-time trigger 46 turning on and off the first switch SW1 and the second switch SW2 is then controlled. Due to the frequency f2 of the switching regulator 40 is adjusted by variations of the on-time $T_{ON}$ and off-time $T_{OFF}$. This takes one step further to fix frequency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A switching regulator for fixing a frequency comprising:
    a power stage, the power stage comprising:
        a first switch;
        a second switch coupled to the first switch; and
        an output inductor coupled to the first switch and the second switch;
    an output capacitor coupled to the output inductor with an output voltage across the capacitor;
    a first reference voltage generator used for generating a first reference voltage;
    a comparator having a first input end coupled to the output inductor and the output capacitor and a second input end coupled to the first reference voltage generator for receiving the first reference voltage, the comparator used for comparing signals received at the first and second input ends;
    a constant-time trigger coupled between an output end of the comparator and a control end of the power stage, the constant-time trigger used for controlling turning on and off the first switch and the second switch of the power stage according to a result of the comparator;
    a frequency-to-voltage converter having an input end coupled to an output end of the constant-time trigger for receiving a frequency of the constant-time trigger and an output end for outputting a voltage generated by the frequency-to-voltage converter, the frequency-to-voltage converter used for converting the frequency received at the input end into voltage; and
    an error amplifier having a first input end coupled to the output end of the frequency-to-voltage converter, a second input end for receiving a second reference voltage, and an output end coupled to a control end of the constant-time trigger, the error amplifier used for generating a regulation signal to control the constant-time trigger turning on and off the first switch and the second switch of the power stage according to signals received at the first and second input ends of the error amplifier.

2. The switching regulator of claim 1 further comprising a second reference voltage generator coupled to the second input end of the error amplifier, the second reference voltage generator used for generating the second reference voltage.

3. The switching regulator of claim 1 further comprising a compensator coupled between the output end of the error amplifier and the control end of the constant-time trigger, the compensator used for compensating stability of a loop formed by the error amplifier and the constant-time trigger.

4. The switching regulator of claim 1 further comprising a loading coupled to the output capacitor and the output inductor.

5. The switching regulator of claim 1 wherein the output capacitor comprises an equivalent series resistance.

6. The switching regulator of claim 1 wherein the first switch and the second switch are metal-oxide semiconductor transistors (MOS).

7. The switching regulator of claim 1 further comprising an inverter coupled to the constant-time trigger and a control end of the second switch for processing an inverse operation on a signal outputted from the constant-time trigger.

8. The switching regulator of claim 1 wherein the constant-time trigger is an on-time trigger.

9. The switching regulator of claim 1 wherein the constant-time trigger is an off-time trigger.

10. A switching regulator for fixing a frequency comprising:
   a plurality of power stages, wherein each power stage comprises:
      a first switch;
      a second switch coupled to the first switch; and
      an output inductor coupled to the first switch and the second switch;
   an output capacitor coupled to the output inductor with an output voltage across the capacitor;
   a first reference voltage generator used for generating a first reference voltage;
   a comparator having a first input end coupled to the output inductor and the output capacitor and a second input end coupled to the first reference voltage generator for receiving the first reference voltage, the comparator used for comparing signals received the first and second input ends;
   a constant-time trigger coupled between an output end of the comparator and a control end of the plurality of power stages, the constant-time trigger used for controlling turning on and off the first switch and the second switch of the plurality of power stages according to a result of the comparator;
   a frequency-to-voltage converter having an input end coupled to an output end of the constant-time trigger for receiving a frequency of the constant-time trigger and an output end for outputting a voltage generated by the frequency-to-voltage converter, the frequency-to-voltage converter used for converting the frequency received at the input end into voltage; and
   an error amplifier having a first input end coupled to the output end of the frequency-to-voltage converter, a second input end for receiving a second reference voltage, and an output end coupled to a control end of the constant-time trigger, the error amplifier used for generating a regulation signal to control the constant-time trigger turning on and off the first switch and the second switch of the power stage according to signals received at the first and second input ends of the error amplifier.

11. The switching regulator of claim 10 further comprising a second reference voltage generator coupled to the second input end of the error amplifier, the second reference voltage generator used for generating the second reference voltage.

12. The switching regulator of claim 10 further comprising a compensator coupled between the output end of the error amplifier and the control end of the constant-time trigger, the compensator used for compensating stability of a loop formed by the error amplifier and the constant-time trigger.

13. The switching regulator of claim 10 further comprising a loading coupled to the output capacitor and the output inductor.

14. The switching regulator of claim 10 wherein the output capacitor comprises an equivalent series resistance.

15. The switching regulator of claim 10 wherein the first switch and the second switch are metal-oxide semiconductor transistors (MOS).

16. The switching regulator of claim 10 further comprising an inverter coupled to the constant-time trigger and a control end of the second switch for processing an inverse operation on a signal outputted from the constant-time trigger.

17. The switching regulator of claim 10 wherein the constant-time trigger is an on-time trigger.

18. The switching regulator of claim 10 wherein the constant-time trigger is an off-time trigger.

* * * * *